(No Model.) 3 Sheets—Sheet 1.

J. L. JANEWAY, Dec'd.
P. W. Janeway & T. L. Hodge, Administrators.
APPARATUS FOR MANUFACTURING GAS.

No. 575,955. Patented Jan. 26, 1897.

(No Model.)  3 Sheets—Sheet 2.

J. L. JANEWAY, Dec'd.
P. W. Janeway & T. L. Hodge, Administrators.
APPARATUS FOR MANUFACTURING GAS.

No. 575,955. Patented Jan. 26, 1897.

(No Model.)
J. L. JANEWAY, Dec'd.
P. W. Janeway & T. L. Hodge, Administrators.
APPARATUS FOR MANUFACTURING GAS.
No. 575,955. Patented Jan. 26, 1897.
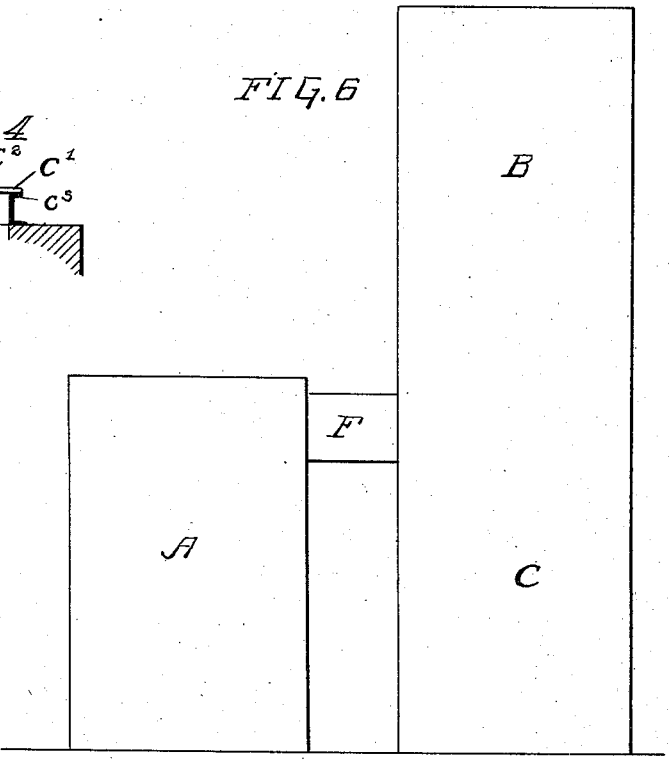

UNITED STATES PATENT OFFICE.

JOHN L. JANEWAY, OF OAKS, PENNSYLVANIA; PRICE W. JANEWAY AND THOMAS L. HODGE, ADMINISTRATORS OF SAID JOHN L. JANEWAY, DECEASED, ASSIGNORS TO THE PHŒNIX GAS AND IMPROVEMENT COMPANY, OF PHILADELPHIA, PENNSYLVANIA.

APPARATUS FOR MANUFACTURING GAS.

SPECIFICATION forming part of Letters Patent No. 575,955, dated January 26, 1897.

Application filed August 27, 1895. Serial No. 560,660. (No model.)

*To all whom it may concern:*

Be it known that I, JOHN L. JANEWAY, a citizen of the United States, residing at Oaks, in the county of Montgomery and State of Pennsylvania, have invented certain new Apparatus for Manufacturing Gas; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain improvements in the manufacture of gas either for illuminating purposes or for fuel, and has for its object to simplify, improve, and cheapen the method of producing the same and the apparatus by which such processes may be carried into effect.

Figure 1:
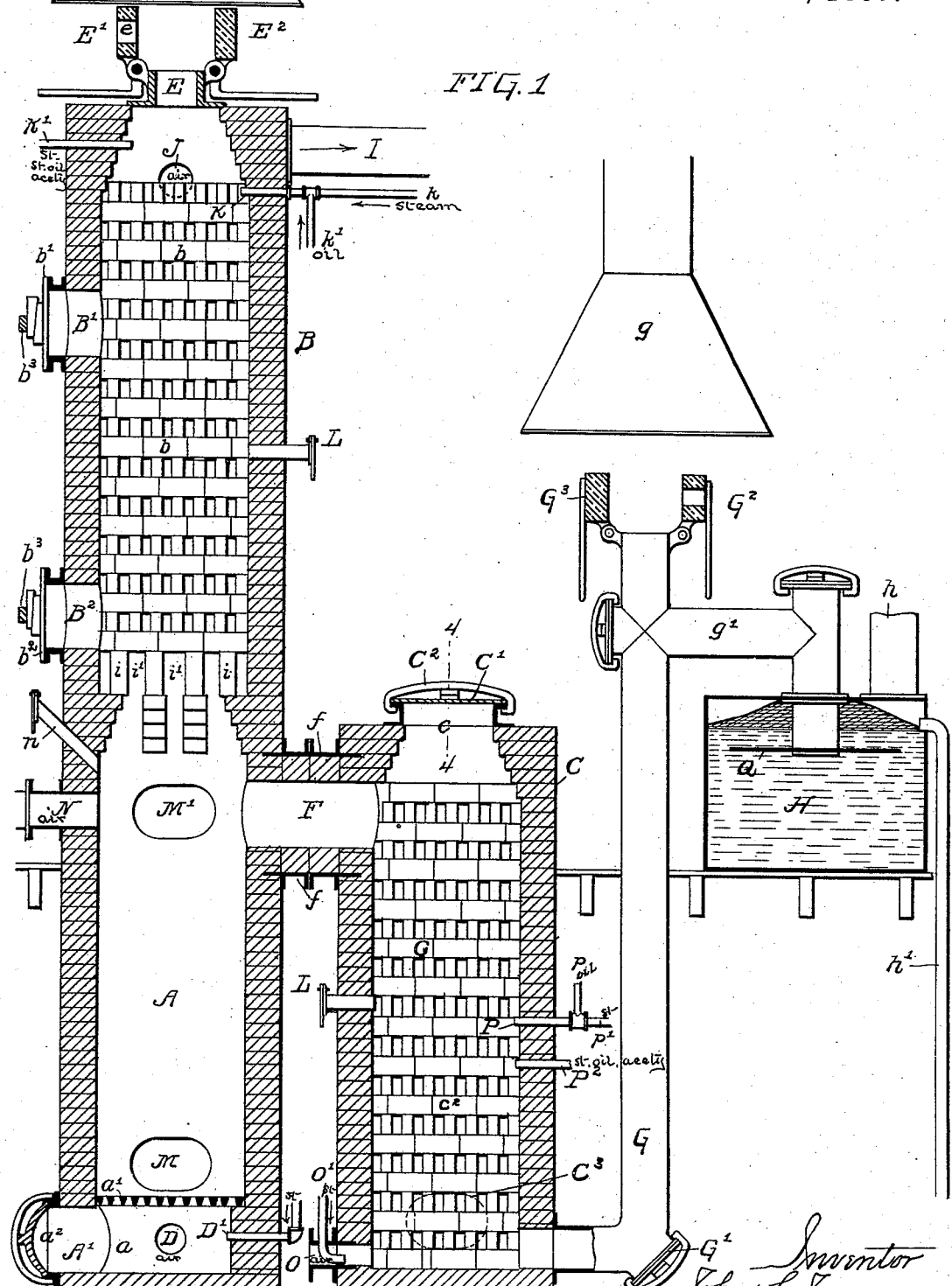
Figure 2:
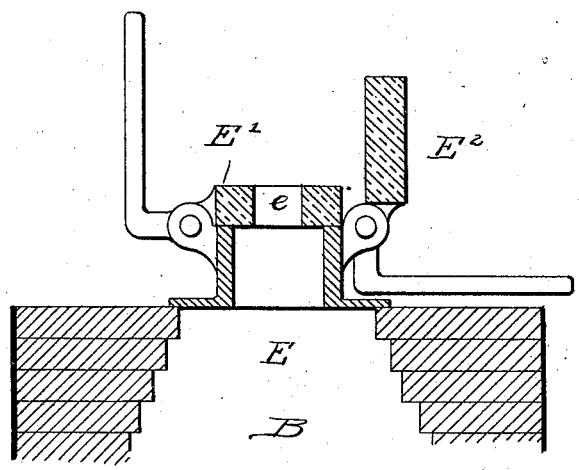
Figure 3:
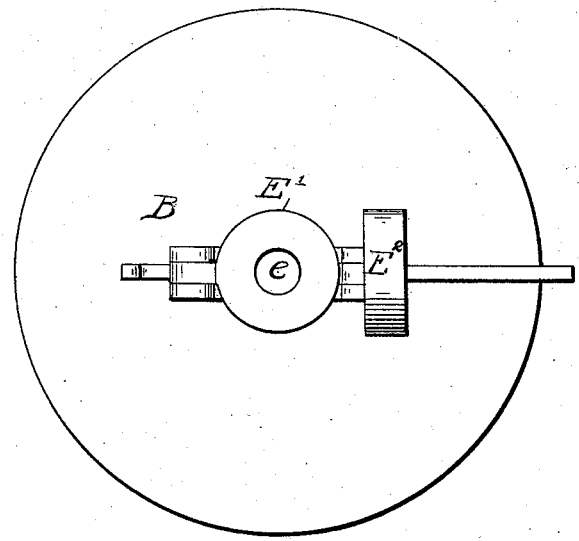

In the accompanying drawings, Figure 1 is a sectional elevation of an apparatus by which my improved process may be carried into effect. Fig. 2 is a sectional elevation, on a somewhat larger scale, illustrating the construction and arrangement of one of the outlet-valves. Fig. 3 is a plan view of the parts shown in Fig. 2. Fig. 4 is a sectional elevation on the line 4 4, Fig. 1; and Figs. 5 and 6 are sectional elevations similar to Fig. 1, showing a modified arrangement of the various chambers.

Referring to the drawings, A represents a suitable chamber, preferably cylindrical in form, and lined throughout with fire-brick or similar refractory material. At the lower end of the chamber A is an ash-pit $a$, separated from the main chamber by a suitable grate $a'$ for the support of the carbonaceous material used in the manufacture of the gas. Below the ash-pit or extending therefrom is a passage A', closed by a suitable door $a^2$, through which the ashes may be removed. Extending into the ash-pit is an air-pipe D and a steam-pipe D', through which air and steam may be admitted during the process of heating up the apparatus or manufacturing gas.

The fire-brick walls of the lower chamber A are continued up for a sufficient distance to form an upper chamber B, and the fire-brick at the upper part of the chamber B is gradually narrowed to form an outlet E for the escape of the products of combustion, the outlet being provided with two hinged valves E' E², either of which may be closed when necessary.

Connected to the chamber A is a chamber C, also lined with fire-brick and provided with an upper manhole $c$, having a cover C', secured in position by a yoke C², as illustrated in Fig. 4 and more particularly referred to hereinafter. At the bottom of the chamber C is a door C³, this door and the manhole $c$ being employed for the purpose of placing in the chamber a supply of checker-work fire-brick or other refractory material $c^2$ and for the renewal of the same when necessary. This checker-work fire-brick is so arranged as to leave between the bricks a series of passages which will permit the free flow of the products of combustion or the gases generated in any of the chambers or to superheat air for the support of combustion in the upper chamber B.

The trunk F, which connects the upper end of the chamber A to the upper end of the chamber C, is also lined throughout with firebrick, so as to avoid undue heating of the metallic shell $f$, which forms the supporting-casing, and to save the loss of heat by radiation.

From the lower end of the chamber C extends a pipe G, having at the elbow or bend a door G'. This pipe extends upwardly to a point directly under a suspended stack $g$, and at its upper end is provided with two valves G² G³, either of which may be closed when necessary. From the pipe G, at a point below its discharge-mouth, extends a pipe $g'$, leading to a washbox H, so that when necessary the gases may be directed to the washbox and from thence may escape by the pipe $h$ to a scrubber, condenser, purifier, or directly to the gas-holder.

At the upper end of the chamber A, where it joins the chamber B, the fire-brick are set closer toward the center, being extended inwardly to form an open archway for the support of a series of transversely-disposed firebrick or other refractory material $i$, so arranged as to leave between them a series of passages $i'$, which will permit the free flow of the products of combustion or of the gases generated in chambers A and B or in chambers A and C. This layer of fire-brick $i$ serves to support the checker-work fire-brick or other refractory material $b$ in the upper chamber B, the latter being filled with fire-brick in the same manner as described with reference to chamber C.

In the upper chamber B are two openings $B'$ $B^2$, closed, respectively, by doors $b'$ $b^2$, locked in place by yokes $b^3$ or other suitable devices, these openings serving as a convenient means for setting the checker-work fire-brick in position and for removing the same when necessary.

At the upper end of the chamber B is an escape-pipe I, leading to the washbox H or to a separate washbox, if desired, this passage serving as an escape for gases which may be generated during the operation of the apparatus, as more fully set forth hereinafter. In the upper portion of the chamber B is an air-pipe J and an inlet K, having two connections $k$ and $k'$ for the entrance of steam and oil, respectively, and, if desired, a separate steam connection $K'$ may also be introduced in cases where it is desired to employ separate streams of steam and of oil or of steam and of steam and oil. At or about the center of the chamber B is a sight-cock L, and in the chamber C is a similar sight-cock L.

In the lower portion of the chamber A are one or more stoke-doors M, according to the size of the plant, and in the upper portion of said chamber are one or more openings $M'$, through which the solid carbonaceous material may be introduced during the operation of the apparatus and to permit the use of curved sinker-bars to settle the coke. At a point diametrically opposite the trunk F the chamber A is provided with a blast-pipe N, through which a blast of air may be forced to intermingle with the gases produced in the chamber A and to support combustion in the chambers B and C, so as to store heat in the checker-work in said chambers, and, further, to act when necessary as a forcing medium for directing the gases generated in the chambers A and B through the trunk F and down through the chamber C and out the escape-pipe G. At the upper end of the chamber A is an inclined sight-cock $n$, through which may be viewed the operation at this point.

In the lower portion of the chamber C is an air-pipe O and a steam-pipe $O'$, so that either air or steam, or a mingled jet of air and steam, may be simultaneously injected into the chamber, and at a point about midway of the chamber C is a pipe P, having oil and steam connection $p$ and $p'$, respectively, so that either oil or steam or a mingled jet of both oil and steam may be injected. If desired, a separate pipe $P^2$ may also be employed for the purpose of forcing into the chamber a separate jet of oil or steam.

At the upper end of the chamber B is an escape E, as previously described, and immediately above this escape is suspended a suitable stack through which the products of combustion may pass, and as the working of the apparatus will at times require the partial closing or the entire closing of this escape-passage, two valves $E'$ $E^2$ are employed, the valve $E'$ having a central opening $e$ of an area much less than the area of the escape E, so as to limit the quantity of gases which may escape thereto, while the valve $E^2$ is a solid valve, which completely closes the mouth of the escape E and prevents the passage of any of the gases or products of combustion.

The valves $G^2$ $G^3$ at the upper end of the escape-pipe G are of similar construction to the valves $E'$ $E^2$, and operate in a similar manner, so that the escape of the products of combustion through both passages may be regulated.

In the locking of the various doors with which the apparatus is provided it has been found difficult to seal the doors sufficiently to prevent the escape of gas, and in order to provide a simple and cheap mode of fastening and sealing of the doors I provide the construction shown in Fig. 4, in which $c$ represents the casing surrounding the opening and $c^3$ an annular flange at the outer end of the same. To this flange $c^3$ is fitted the door $C'$, having an inclined lug $v'$, and over the annular flange and door is passed a clamping-yoke $C^2$, the clamp fitting loosely over the inclined lug $v'$ in such manner that wedges $v^2$ may be inserted between the clamp and lug and then driven home in any suitable manner to more tightly clamp the door in position.

At the point where the vertical portion of the pipe G is connected to that portion which extends to the base of the chamber C an opening is formed, the opening being normally closed by a cap-piece $G'$ at all times save when it becomes necessary to remove it to examine the condition of the pipe.

In the cleansing of the outlet-pipe G it has heretofore been usual to employ flue-cleaners or scrapers to remove the deposit of lampblack or soot, this being a very slow, tedious, and objectionable manner of cleaning. In carrying out my invention to clean the pipe G and the chamber C from any deposit of lampblack or soot I start the cleaning operation immediately after a "run" of gas-making is finished, or else heat up the chamber C to a cherry-red in the usual manner, as if a run were to be made. When the desired heat is obtained, all valves excepting those at the top of the pipe G are closed and the air-blast pipe N in chamber A is opened, the air so forced in passing down through the checker-work in chamber C, and, becoming highly heated, burns out all of the lampblack in the chamber and in the pipe G. This action may be assisted, if desired, by opening the air-blast pipe O at the bottom of chamber C, and by reversing the direction of flow of air and forcing the same up through the chamber B the latter may be cleansed of lampblack in the same manner, or the door G' at the bend of the pipe G may be opened.

The washbox H is almost wholly filled with water, being provided with an overflow-pipe $h'$, leading to a water-seal, and the gas-pipe $g'$ leads down through an opening in a plate Q, which covers almost the entire area of the washbox and forces the escaping gas while traveling to the edge of the plate to pass through a considerable quantity of water before finally escaping through the pipe $h$. The washbox is provided with suitable cleaning-openings for the purpose of removing the accumulated tar, &c.

In the process of manufacturing an illuminating-gas the chamber A is filled with a quantity of carbonaceous material, such as anthracite or bituminous coal, coke, culm, or slack. The outlet E is opened and the valves on the upper end of the pipe G are closed, so that all of the products of combustion must necessarily pass up through the checker-work in chamber B and escape through the outlet E. The fire having been started, the air-blast pipe D at the bottom of the chamber A is opened and a sufficient quantity of air is admitted to support combustion in the chamber A, perfect combustion taking place up to the clinker-line of the chamber, say about two feet, more or less, above the grate-bars, according to the depth of the fuel and the size of the chamber. Above the clinker-line the coal or other carbonaceous material is subjected to destructive distillation, and the gases thus formed meet an incoming blast of air forced through the pipe N and burn up through the checker-work fire-brick or other refractory material in the chamber B until it is sufficiently heated, according to the character of the material used in the chamber B to enrich the water-gas to be subsequently made in the chamber A. The valve E', having the central opening $e$, is then closed, so that only a small quantity of the products of combustion may pass through the escape $e$, and the valves on top of the pipe G are opened to permit the passage of the products of combustion through the trunk F and through the chamber C, and from thence out through the pipe G to the stack $g$, or the valve $E^2$ may be closed, so that all the products of combustion may pass through the chamber C and heat said chamber to the desired degree of heat. The blast of air admitted through the pipe N directs the products of combustion through the trunk F and consumes the gases in its passage through the checker-work fire-brick in chamber C to impart to it the desired heat. After the chambers have been heated to the desired point the process of manufacturing gases is commenced, the gases being produced in the producing-chambers A and B and conducted through the trunk F to the fixing-chamber C and from thence to the washbox.

In starting the operation, all valves and escapes being closed, the steam-blast D' in the bottom of the chamber A is opened and the desired amount of steam admitted. One or more of the pipes $k$ $k'$, K and K', at top of chamber B are opened and the escape-passage G $g'$ leads them directly to the washbox H. The steam entering the lower portion of the chamber A from the blast-pipe D' passes up through the mass of incandescent carbon in the chamber A and is decomposed, forming a so-called "water-gas" consisting of carbonic oxid and free hydrogen.

The oil and steam forced into the chamber B through the pipes $k$ $k'$, and, if necessary, through the additional pipe K', are forced down through the highly-heated checker-work fire-brick or other refractory material in the chamber B, the steam acting as a forcing medium to force the gas formed from the oil down through the chamber and preventing the oil from flashing into lampblack, while the steam is practically decomposed in its passage down through chamber B, and meeting the highly-heated water-gas at top of chamber A the decomposed steam takes up sufficient carbon to form a water-gas. The two bodies of gases formed in the chambers A and B meet at a point opposite the trunk F and intermingling pass down through the highly-heated refractory material in the chamber C and become fixed, the gases finally escaping through the pipes G $g'$ to the washbox in the form of a fixed gas composed of a mixture of water-gas, oil-gas, and carbureted hydrogen. This process of manufacturing gas is continued until the heat of the chambers is reduced and another heat is blown up, when all the valves being again closed air-blast D in lower portion of chamber A, escape E at upper end of chamber B, and air-blast O at lower end of chamber C are opened. The operation in chamber A is the same as previously described, the gases arising from the destructive distillation of the coal or other carbonaceous material burning up through the chamber B. The chamber C, owing to its much higher heat due to the passage of heated gas during the fixing process, highly heats the air entering through the air-blast O, and this highly-heated blast of air passes through the trunk F and mingles with the gases produced in chamber A, supporting combustion in the chamber B and heating the refractory material in the latter to a degree depending upon the character of the carbon oil or gases to be injected into said chamber B. After the chambers have been heated to the desired point the various valves are closed and steam-jet D' in the lower portion of chamber A is opened to form a water-gas, as previously described. The oil and steam jets $p$ $p'$ and, if necessary, the additional steam-jet $P^2$ or the steam-jet $O'$ in chamber C are opened, and the oil and steam admitted are forced upwardly through the highly-heated checker-work fire-brick or other refractory material in the chamber C, the steam acting as a forcing medium to force the oil up through the chamber and preventing the oil from flashing into lampblack, while the steam when it reaches the upper end of the chamber is practically decomposed and takes up sufficient carbon to form a water-gas on its entrance into top of chamber A. The two bodies of gas formed in the chambers A and C meet at the trunk F, and, intermingling, pass up through the highly-heated refractory material in the chamber B and become fixed, and from thence finally escape through the passage L to a wash box or holder. This process is kept up until the heat of the chambers is reduced, when another heat is blown up and the same operation takes place as was first described, making the runs of gas alternately down and up and using the chambers C and B alternately as fixing-chambers, the last used fixing-chamber yielding up its surplus of heat to form a hot blast, which is found highly advantageous and economical in the burning of the gases and the heating up of the chambers, while at the same time sufficient heat is retained to enable the chamber to vaporize the injected oil and act as a gas-producing chamber.

The arrangement of the chambers A, B, and C may be modified, as shown in Figs. 5 and 6, Fig. 5 representing the chambers arranged side by side, with the coal-chamber A in the center and the alternate producing and fixing chambers on either side thereof, while in Fig. 6 the chamber B is mounted above the chamber C. It is clear, however, that in both these arrangements the flow of gases and the use of the chambers B and C as fixing and air-heating chambers may be precisely the same as described, with reference to Fig. 1.

The apparatus which I employ is of simple and economical construction, and by changing the direction of the blast a hot-air blast may be obtained, thus saving and utilizing the heat which would otherwise go to waste. The employment of the chambers B and C alternately as fixing and heating chambers for the air-blast enables the use of the surplus heat of these chambers without lowering the temperature to an extent sufficient to endanger the proper vaporization of the oil.

Having thus described my invention, what I claim, and desire to secure by Letters Patent, is—

1. The combination of the combustion-chamber, a second chamber filled with checker-work fire-brick and in direct communication with said combustion-chamber, an outlet leading from the upper portion of said second chamber, an air-blast pipe leading into the upper part of the combustion-chamber, a fixing-chamber, checker-work fire-brick therein, an escape-pipe leading from the lower portion of the fixing-chamber for the escape of the manufactured gas, steam and oil pipes provided midway and steam and air pipes at lower end of said fixing-chamber, and a passage-way leading into and directly connecting the upper end of both the combustion-chamber and the fixing-chamber, substantially as shown and described.

2. The combination of the lower chamber A, having at its upper end arching fire-brick, an air-blast pipe leading into the upper end of said chamber, fire-brick $i$ resting on the arched fire-brick in such manner as to permit the free flow of gases, an upper chamber B, fire-brick $b$ therein supported by the fire-brick $i$, a chamber C, steam and oil pipes provided midway and steam and air pipes at the lower end of chamber C, an escape-pipe leading from the lower portion of said chamber C for the escape of the manufactured gas, and a communicating passage-way leading into and directly connecting the upper end of both the combustion-chamber and the fixing-chamber, substantially as shown and described.

3. The combination of the combustion-chamber A, a chamber B placed directly above and in communication with the chamber A, checker-work $b$ in said upper chamber, an escape E at the upper end of the chamber B, a valve $E'$ having a passage $e$ adapted to said escape, a closing-valve $E^2$, a fixing-chamber C, and a communicating passage-way F extending between the combustion-chamber and the fixing-chamber, substantially as specified.

4. The combination of the combustion-chamber A, having a lower ash-pit $a$, and a grate $a'$ between the ash-pit and the main body of the chamber, an ash-door $A'$, an air-pipe D and a steam-pipe $D'$, all extending into the ash-pit, doors M, $M'$, opening into said chamber, an air-pipe N at the upper end of said chamber, a superposed chamber B having an escape E for the products of combustion, and an escape I for the manufactured gas, a steam and oil pipe $k$, $k'$, and an air-pipe J, all situated in the upper end of the chamber B, a chamber C, a passage-way F extending between the combustion-chamber and the chamber C, steam and oil pipes provided midway of said chamber, steam and air pipes at the lower end of said chamber, and an escape-pipe G situated at the lower end of the chamber C for the escape of the manufactured gas, substantially as specified.

In testimony whereof I affix my signature in presence of two witnesses.

JOHN L. JANEWAY.

Witnesses:
JNO. E. PARKER,
FRED P. WIKOFF.